(12) United States Patent
Park et al.

(10) Patent No.: US 7,894,486 B2
(45) Date of Patent: Feb. 22, 2011

(54) METHOD FOR DEPACKETIZATION OF MULTIMEDIA PACKET DATA

(75) Inventors: Young-O Park, Suwon-si (KR);
Bong-Gon Kim, Seoul (KR);
Kwang-Pyo Choi, Anyang-si (KR);
Chang-Sup Shim, Seoul (KR);
Young-Hun Joo, Yongin-si (KR)

(73) Assignee: Samsung Electronics Co., Ltd., Maetan-Dong, Yeongton-Gu, Suwon-Si, Gyeonggi-Do (KR)

( * ) Notice: Subject to any disclaimer, the term of this patent is extended or adjusted under 35 U.S.C. 154(b) by 677 days.

(21) Appl. No.: 11/642,270

(22) Filed: Dec. 20, 2006

(65) Prior Publication Data

US 2007/0189286 A1 Aug. 16, 2007

(30) Foreign Application Priority Data

Feb. 13, 2006 (KR) .................. 10-2006-0013645

(51) Int. Cl.
*H04J 3/07* (2006.01)
*H04J 3/06* (2006.01)

(52) U.S. Cl. ..................................... 370/506; 370/514
(58) Field of Classification Search ....................... None
See application file for complete search history.

(56) References Cited

U.S. PATENT DOCUMENTS

| 7,212,517 | B2* | 5/2007 | Dzik | 370/352 |
| 7,408,938 | B1* | 8/2008 | Chou et al. | 370/394 |
| 2003/0123537 | A1* | 7/2003 | Yona et al. | 375/240.01 |

FOREIGN PATENT DOCUMENTS

JP 11-251988 9/1999

* cited by examiner

*Primary Examiner*—Ayaz R Sheikh
*Assistant Examiner*—Sori A Aga
(74) *Attorney, Agent, or Firm*—Cha & Reiter, LLC

(57) ABSTRACT

Disclosed is a method for depacketization of multimedia packet data, the method comprising: a context-aware step of parsing and recording a start code, which can identify each frame, in a first portion of a payload of a real-time transport protocol (RTP) packet; and a step of performing depacketization according to each packet by using the start code.

4 Claims, 8 Drawing Sheets

METHOD FOR DEPACKETIZATION OF MULTIMEDIA PACKET DATA

CLAIM OF PRIORITY

This application claims the benefit under 35 U.S.C. 119(a) of an application entitled "Method For Depacketization Of Multimedia Packet Data," filed in the Korean Intellectual Property Office on Feb. 13, 2006 and assigned Ser. No. 2006-13645, the entire contents of which are incorporated herein by reference.

BACKGROUND OF THE INVENTION

1. Field of the Invention

The present invention relates to technology for transmission/reception of multimedia data based on a packet network, and more particularly to a method for depacketization of multimedia packet data.

2. Description of the Related Art

Currently, a download-type transmission scheme and a stream-type transmission scheme are used to transmit image (i.e., video) and voice (i.e., audio) data in a packet network, such as the Internet. According to the download-type transmission scheme, a terminal must first accumulate an image file as it is transmitted from a server, and the terminal reproduces data of the file after transmission of the file has been completed. When a file is transmitted in such a download-type transmission scheme, a terminal cannot produce data of the file until transmission of the file has been completed. Therefore, the download-type transmission scheme is unsuitable to be used for long duration transmission for reproduction of image data or the like.

However, the stream-type transmission scheme enables a terminal to reproduce received data, even while data is being transmitted from a streaming server to the terminal. Such a stream-type transmission scheme is performed by mainly using a real-time transport protocol (RTP) (1997) such as that stipulated in request for comment (RFC) 1889 of the Internet Engineering Task Force (IETF).

FIG. 1 is a block diagram illustrating a conventional transmission procedure of multimedia packet data using a stream-type transmission scheme based on a packet network. First, a multimedia data generation unit 102 of a transmitting section 10 compresses image data acquired through an external camera and/or voice data acquired through a microphone, by using various coders. Such a compression operation generates a compressed bitstream. A packetization unit 104 performs a packetization task to match the bitstream, which has been generated by the multimedia data generation unit 102, to at least one sequentially numbered packet in order to transmit the bitstream as a sequence of the at least one sequentially numbered packet through a channel. A packet transmission unit 106 transmits the at least one sequentially numbered packet, which has been generated by the packetization unit 104, through the channel by using a protocol such as user datagram protocol/Internet protocol (UDP/IP).

A packet reception unit 126 of a receiving section 12 parses UDP/IP data received through the channel, and outputs a packet obtained through the parsing to a depacketization unit 124. The depacketization unit 124 performs a process that is the inverse of the packetization process performed by the packetization unit 104 of the transmitting section 10. That is, the depacketization unit 124 functions to extract one meaningful bitstream by accumulating parts of the bitstream from a plurality of received sequentially numbered packets. A multimedia data processing unit 122 functions to reproduce various multimedia data from the accumulated parts of the bitstream, which have been extracted by the depacketization unit 124, by using video/audio decoders.

FIG. 2 is a detailed flowchart illustrating a conventional depacketization operation of the depacketization unit 124. First, terms used in the flowchart of FIG. 2 are defined as follows. "BITSTREAM_COMPLETED" indicates task completion, "BITSTREAM_TRUNCATED", "ATTACH_TO_BUF", and "FLUSH_BUF", which are referred to as "notify reason", are used to notify an upper layer of a result of a depacketization process. The term "ATTACH_TO_BUF" is an instruction to attach a current packet to a buffer because the current packet has completed accumulation of a bitstream. The term "BITSTREAM_COMPLETED" indiates that a current packet has completed accumulation of one meaningful bitstream. The term "FLUSH_BUF" is an instruction to empty a current buffer because it is impossible to configure a current bitstream due to an error or another reason. The term "BITSTREAM_TRUNCATED" indicates that only the bitstream information accumulated up to the current time is meaningful and information after "BITSTREAM_TRUNCATED" has been lost due to error.

In addition, terms indicating each state are defined as follows. Term "prev_error" indicates that an error has occurred in a bitstream. Term "first_error" indicates that a first packet of a bitstream has been lost. Term "prev_bs_end" indicates that a previous packet has completed the accumulation of one bitstream. Term "cur_bs_end" indicates that a current packet corresponds to an end of a bitstream. Term "prev_seq" indicates the sequence number of a previous packet. Term "cur_seq" indicates the sequence number of a current packet.

The depacketization operation is now described in detail with reference to FIG. 2. When a current packet is input, first, it is determined if a previous packet has completed accumulation of a bitstream (step 402). When the previous packet has not completed the accumulation of the bitstream, it is determined if a first packet of the bitstream has been lost (step 404). When the first packet of the bitstream has not been lost, it is determined if an error has occurred in the bitstream (step 406). When an error has not occurred in the bitstream, it is determined if a value obtained by adding one to the sequence number of the previous packet is identical to the sequence number of the current packet (step 408). When the value obtained by adding one to the sequence number of the previous packet is identical to the sequence number of the current packet, it is reported to an upper layer through an "F" block process (step 490) that the current packet has completed the accumulation of one meaningful bitstream.

In the "F" block process (step 490), it is determined if the current packet is an end packet of the bitstream (step 492). Then, when the current packet is not the end packet of the bitstream, it is displayed that the previous packet has not completed accumulation of packets into the bitstream (step 494), it is reported to an upper layer that it is necessary to attach the current packet to a buffer because the current packet has not completed accumulation of the bitstream, the procedure returns to an initial step to receive a next packet, and the above-described steps are repeated. By contrast, when it is determined in step 492 that the current packet is the end packet of the bitstream currently being accumulated, it is displayed that the previous packet has completed accumulation of the bitstream, that an error has not occurred in the bitstream, and that the first packet has not been lost (step 496), the corresponding process ends, and then a succeeding process is performed.

Through such a procedure, it is possible to perform a depacketization process for all packets with only the above-described steps when there is no packet loss.

However, if it is determined that the previous packet has completed the accumulation of the bitstream when the current packet is input (step 402), it is determined if a value obtained by adding one to the sequence number of the previous packet is identical to the sequence number of the current packet (step 410). When the value obtained by adding one to the sequence number of the previous packet is identical to the sequence number of the current packet, it is reported to the upper layer through the "F" block process (step 490) that the current packet has completed accumulation of packets into one meaningful bitstream. By contrast, when it is determined in step 410 that the value obtained by adding one to the sequence number of the previous packet is not identical to the sequence number of the current packet, it is displayed that an error has occurred in the first packet (step 412), and it is reported to an upper layer through the "F" block process (step 490) that it is impossible to configure the current bitstream due to error or another reason and so it is necessary to empty a current buffer.

Meanwhile, if it is determined that the previous packet has not completed accumulation of packets into one bitstream when the current packet is input (step 402) and that the first packet has been lost (step 404), it is reported to the upper layer through the "F" block process (step 490) that it is necessary to empty the current buffer.

Also, if it is determined that the previous packet has not completed accumulation of packets into a bitstream when the current packet is input (step 402), that the first packet has not been lost (step 404), and that an error has occurred in the accumulation of the bitstream (step 406), it is reported to the upper layer through the "F" block process (step 490) that only bitstream information received up to the current time is meaningful and information after the meaningful bitstream information has been lost due to error.

In addition, if it is determined that the previous packet has not completed accumulation of packets into the bitstream when the current packet is input (step 402), that the first packet has not been lost (step 404), that an error has not occurred in the transmission of packets of the bitstream (step 406), and that a value obtained by adding one to the sequence number of the previous packet is not identical to the sequence number of the current packet (step 408), it is displayed that an error has occurred in the transmission of the bitstream (step 409), and it is reported to the upper layer through the "F" block process (step 490) that only the bitstream information received up to the current time is meaningful and information after the meaningful bitstream information has been lost due to error.

Although a depacketization operation may be performed as described above, the above-described depacketization operation cannot cope with a case in which a specific sequence numbered packet in the bitstream being accumulated has been lost. For example, when a third packet has been lost and then a fourth packet has been received, it is impossible to identify whether the received packet is the third packet or the fourth packet, so that the received fourth packet is discarded.

SUMMARY OF THE INVENTION

Accordingly, the present invention provides a method for more efficient depacketization of multimedia packet data, which can reduce packet loss.

In accordance with one aspect of the present invention, there is provided a method for depacketization of multimedia packet data, the method comprising: a context-aware step of parsing and recording a start code, which can identify each frame, on a first portion of a payload of a real-time transport protocol (RTP) packet; and a step of performing depacketization according to each packet by using the start code.

BRIEF DESCRIPTION OF THE DRAWINGS

The above and other features and advantages of the present invention will be more apparent from the following detailed description taken in conjunction with the accompanying drawings, in which.

DETAILED DESCRIPTION

Hereinafter, exemplary embodiments according to the present invention are described with reference to the accompanying drawings. In the following description, many particular items such as a detailed component device are shown, but these are given only for providing a better understanding of the present invention. Therefore, it will be understood by those skilled in the art that various changes in form and detail may be made within the scope of the present invention.

Figure 1:
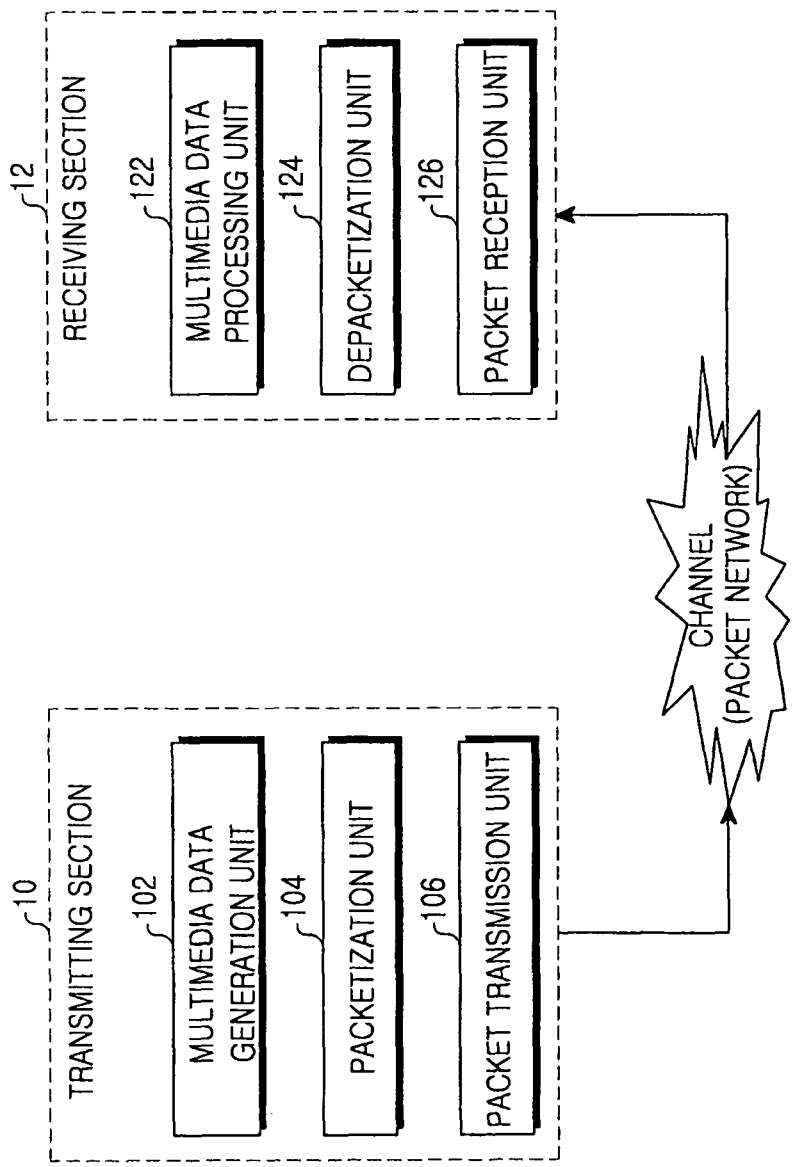
FIG. 1 is a block diagram illustrating a conventional packet network for transmission of multimedia packet data.
Figure 2:
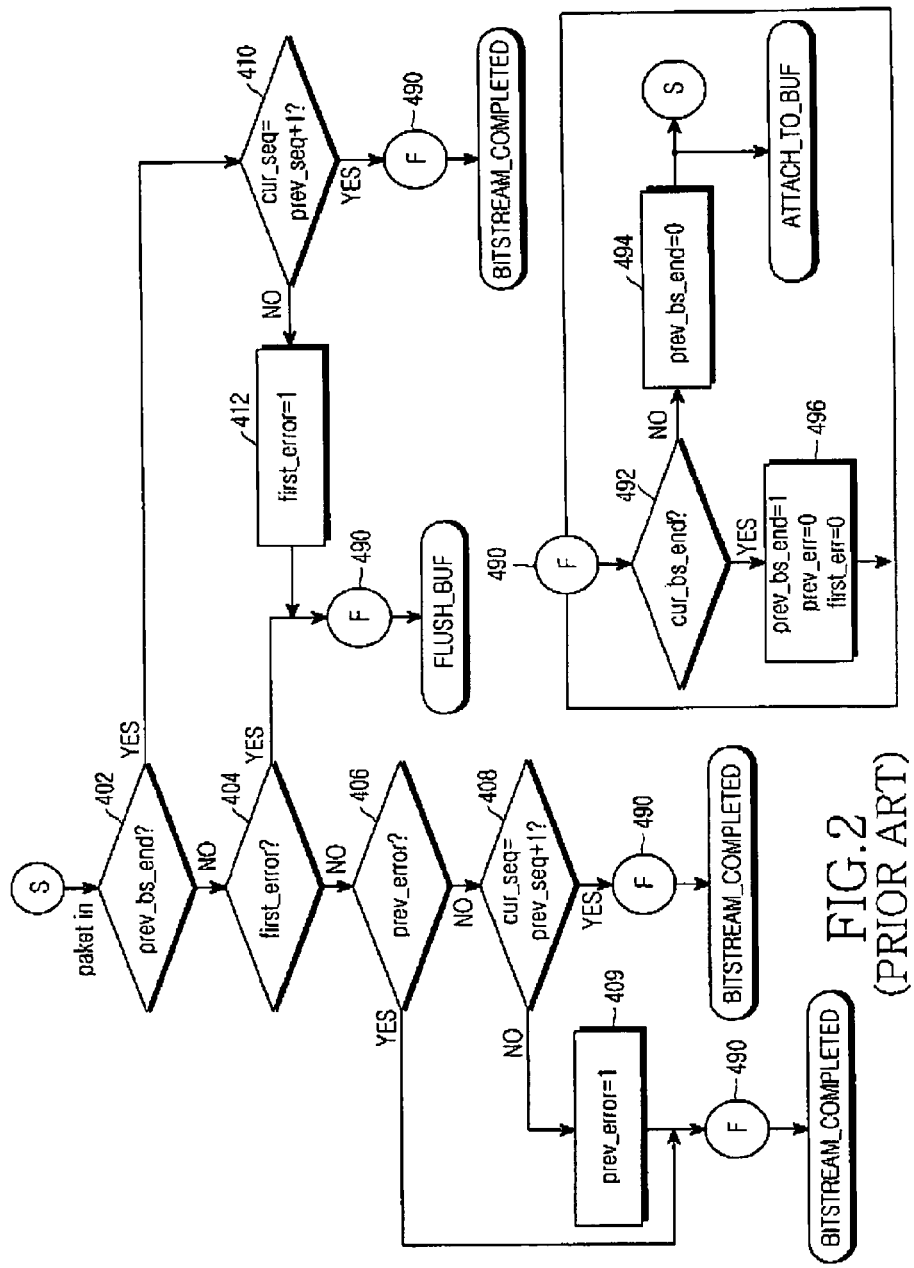
FIG. 2 is a flowchart illustrating a conventional depacketization operation.
Figure 3:
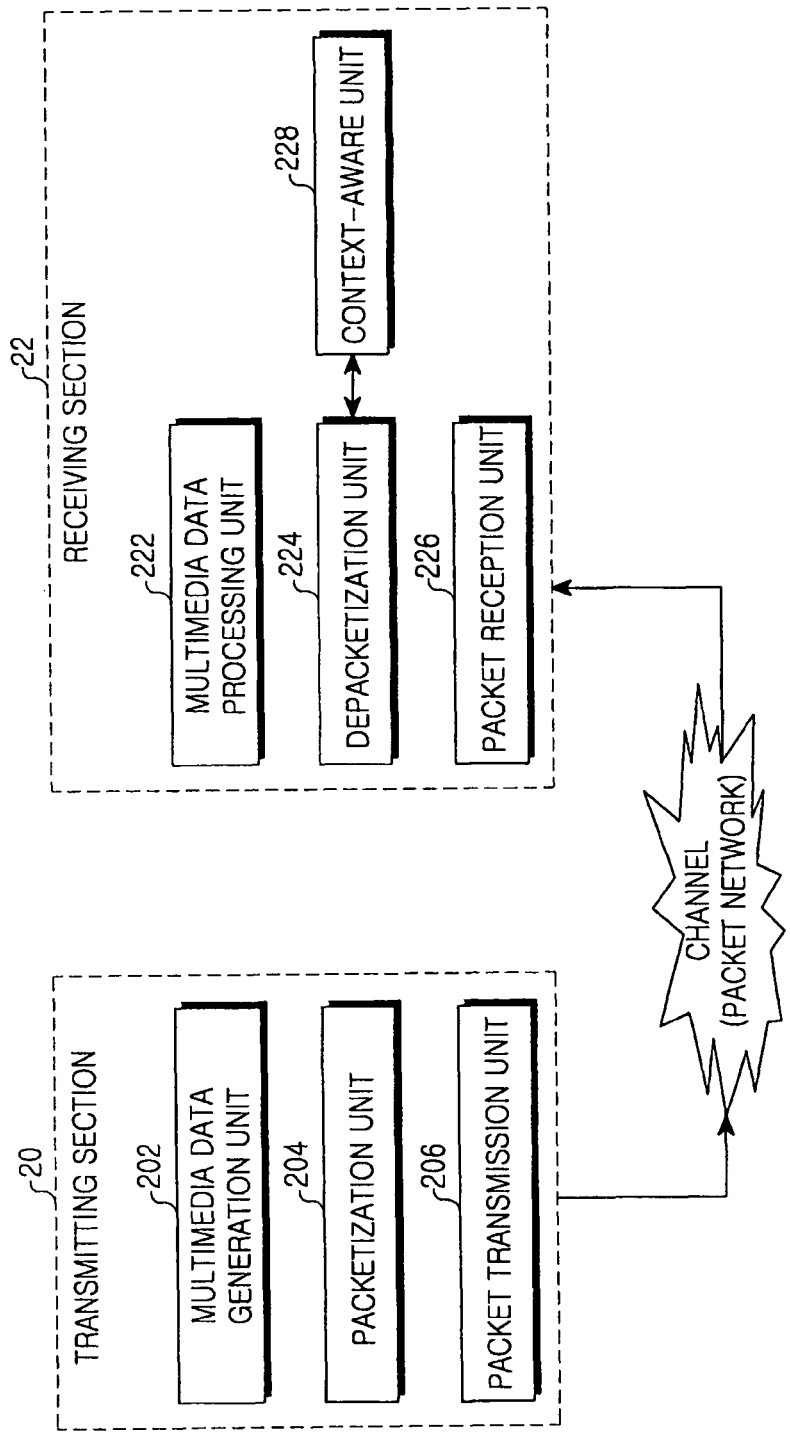
FIG. 3 is a block diagram illustrating a packet network for transmission of multimedia data according to an embodiment of the present invention.

FIG. 3 is a block diagram illustrating a packet network for transmission of multimedia data, according to an embodiment of the present invention. That is, FIG. 3 shows a multimedia data transmission procedure using a context-aware method in a packet network, according to an embodiment of the present invention. First, a transmitting section 20 includes a multimedia data generation unit 202, a packetization unit 204, and a packet transmission unit 206, which are the same as those of the prior art.

A receiving section 22 has components similar to those of the prior art. That is, a packet reception unit 226 parses UDP/IP data received through a channel to obtain a packet, and transmits the packet obtained through the parsing to a depacketization unit 224. The depacketization unit 224 performs a process that is an inverse of the packetization process performed by the packetization unit 204 of the transmitting section 20. A multimedia data processing unit 222 functions to reproduce various multimedia data from the bitstream, which has been obtained by the depacketization unit 224, by using video/audio decoders.

In addition, the depacketization unit 224 performs a depacketization operation by using a context-aware unit 228 according to the of the present invention. The context-aware unit 228 recognizes a start code, which is a first part of a payload of a real-time transport protocol (RTP) packet, with reference to the contents of a bitstream, and notifies the depacketization unit 224 of the start code so that the depacketization unit 224 can identify each frame, thereby enabling the depacketization unit 224 to efficiently perform a depacketization operation. Herein, referring to the contents of a bitstream in a depacketization process is referred to as a kind of cross-layer approach.

Figure 4:
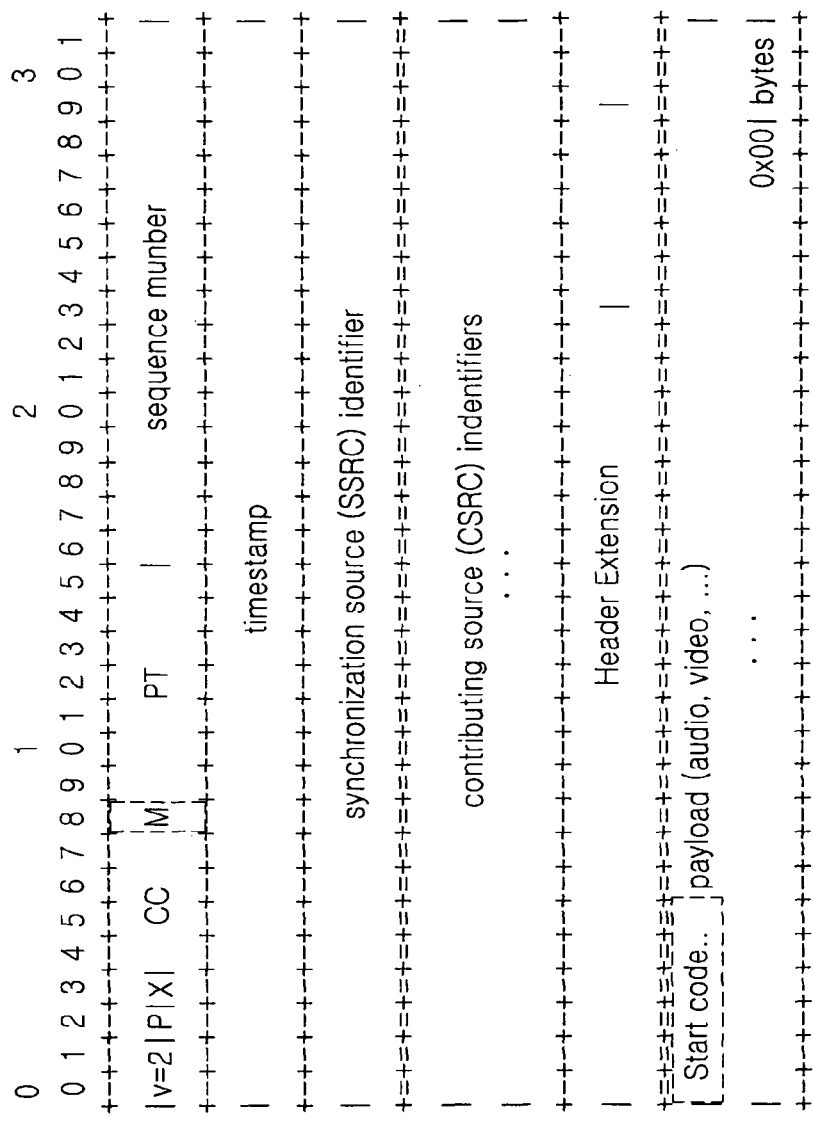
FIG. 4 is a view illustrating the structure of a real-time transport protocol (RTP) which is used for transmission of multimedia data through a packet network.

FIG. 4 is a view illustrating the structure of an RTP which is used for transmission of multimedia data through a packet network. FIG. 4 shows an RTP packet that is partitioned and arranged every 32 bits in which a horizontal axis of "00" to '31" represents locations of a bitstream that is partitioned every 32 bits. In FIG. 4, a range from a section of "v", "P", and "X" to a section of contributing source (CSRC) identifiers corresponds to an RTP header. Herein. "X" represents an extension bit, in which a header extension section is added to the last part of the RTP header when the "X" has a value of "1". All video coders currently-used in H.261, H.263, MPEG-4, H.264, etc. use bit "M" of the RTP header as to indicate the end of one frame (or access unit). In addition, in order to achieve context awareness, according to an embodiment of the present invention, a start code to identify each frame is parsed and is recorded in the first part of a payload of an RTP packet, so that each packet can determine the parsed start code in advance. For example, the start code has a value of "000001B6(hex)" in the case of MPEG-4 and a value of "000001B(hex)" in the case of H.264, so that it is possible to identify the start of each frame of an RTP packet by checking such a start code.

Figure 5A:
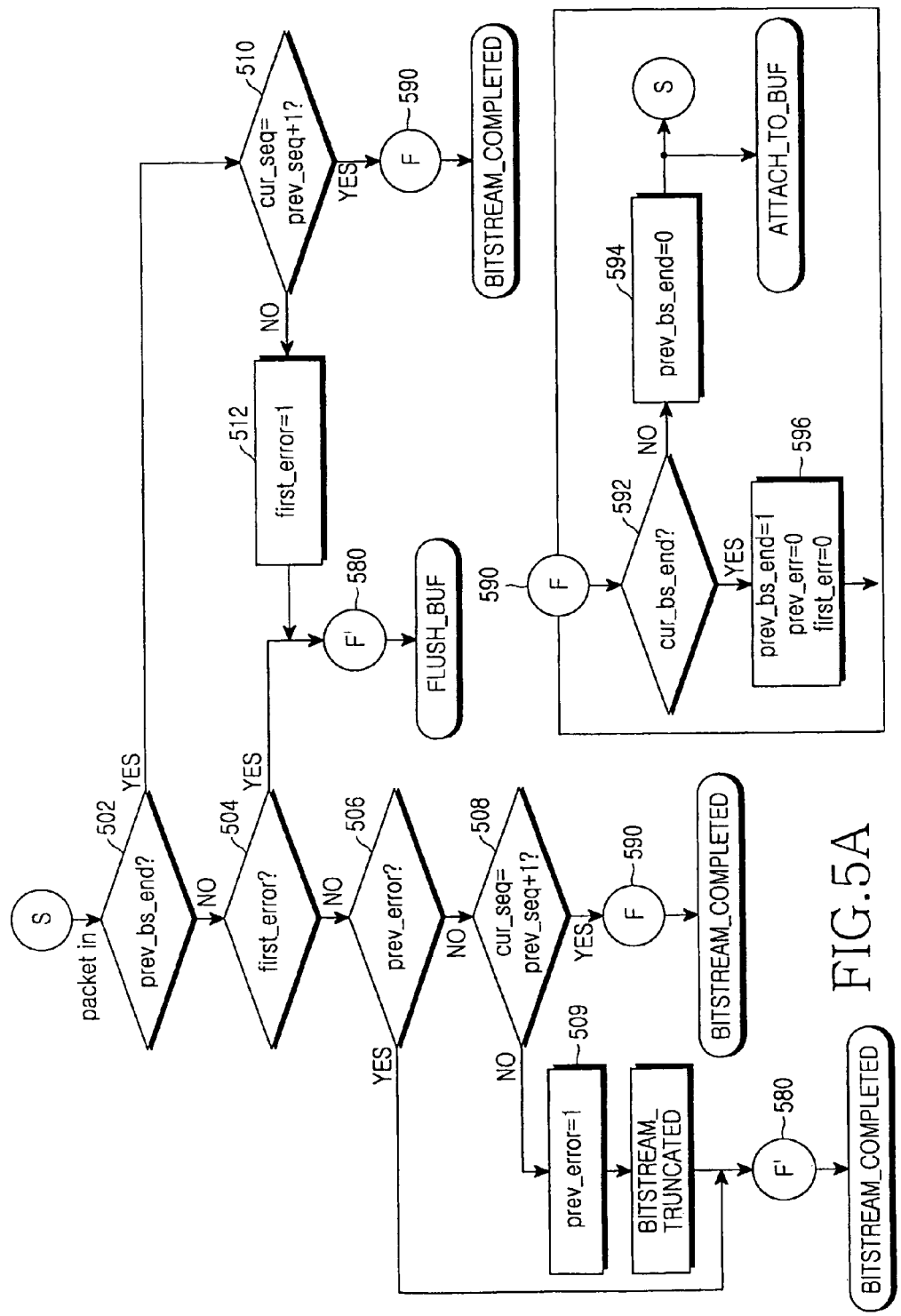
FIGS. 5A and 5B are flowcharts illustrating a depacketization operation according to an embodiment of the present invention.
Figure 5B:
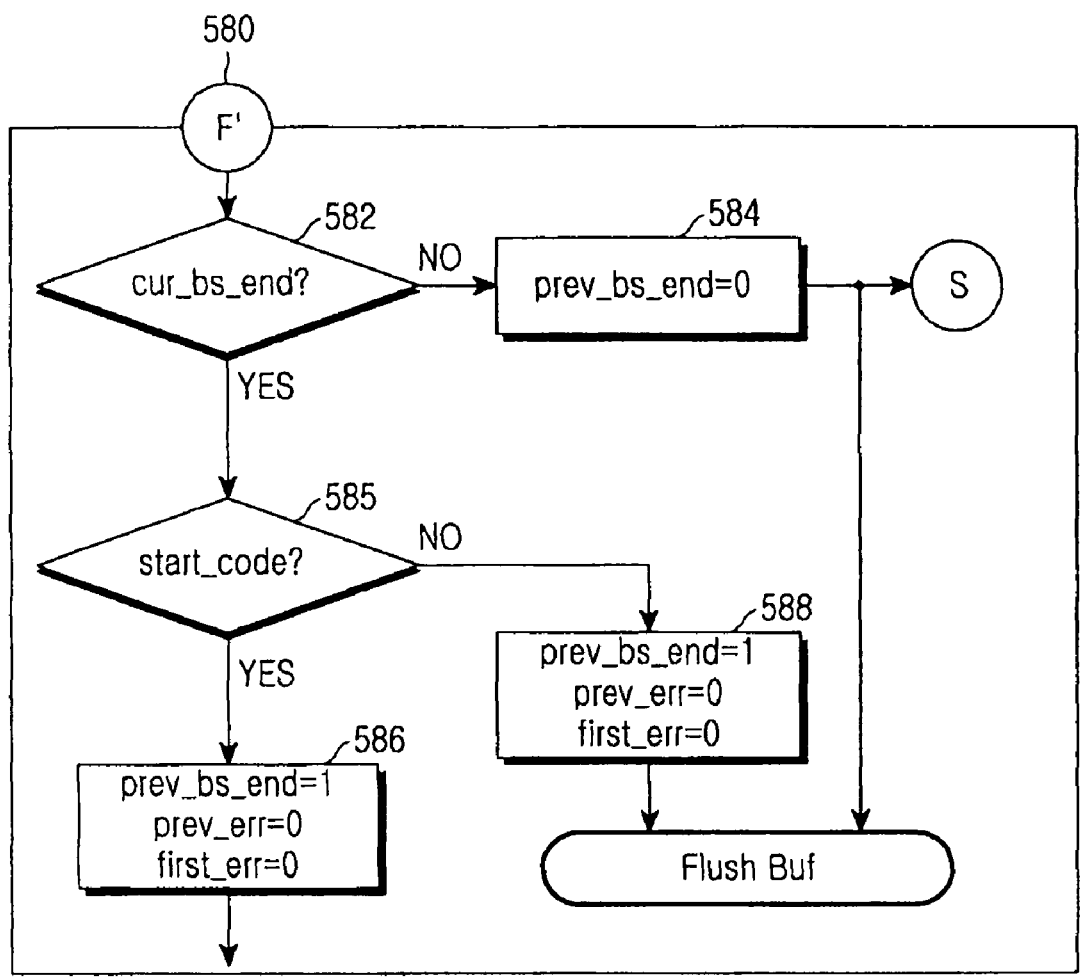

FIGS. 5A and 5B are flowcharts illustrating a depacketization operation according to an embodiment of the present invention. The terms used in FIGS. 5A and 5B have the same meanings as those of the prior art. That is, term "ATTACH_TO_BUF" is an instruction to attach a current packet to a buffer because the current packet has not completed a bitstream. Term "BITSTREAM_COMPLETED" indicates that a current packet has completed a meaningful bitstream. Term "FLUSH_BUF" is an instruction to empty a current buffer because it is impossible to configure a current bitstream due to an error or another reason. The term "BITSTREAM_TRUNCATED" indicates that only the bitstream information received up to the current time is meaningful and information after "BITSTREAM_TRUNCATED" has been lost due to errors.

In addition, terms indicating each state are also defined as follows. Term "prev_error" indicates that an error has occurred in a bitstream. Term "first_error" indicates that a first packet in a bitstream has been lost. Term "prev_bs_end" indicates that a previous packet has completed a bitstream. Term "cur_bs_end" represents that a current packet corresponds to an end of a bitstream. Term "prev_seq" indicates the sequence number of a previous packet. Term "cur_seq" indicates the sequence number of a current packet.

In contrast to the prior art, the present invention additionally provides a user tern of "start_code" indicating a start code. The term "start_code" is a context-aware entity and has a value which is obtained with reference to contents of a bitstream in a protocol level.

The depacketization operation is now described in detail with reference to FIGS. 5A and 5B.

When a current packet is input, first it is determined if a previous packet has been completed into a bitstream (step 502). When the previous packet has not been completed into a bitstream, it is determined if a first packet in one bitstream has been lost (step 504). When the first packet in one bitstream has not been lost, it is determined if an error has occurred in a bitstream (step 506). When an error has not occurred in a bitstream, it is determined if a value obtained by adding one to the sequence number of the previous packet is identical to the sequence number of the current packet (step 508). When the value obtained by adding one to the sequence number of the previous packet is identical to the sequence number of the current packet, it is reported to an upper layer through an "F" block process (step 590) that the current packet has completed a meaningful bitstream.

Herein, the "F" block process (step 590) is performed in the same manner as that of the prior art. That is, it is determined if the current packet is an end packet of a bitstream (step 592). Then, when the current packet is not the end packet of a bitstream, it is displayed that the previous packet has not been completed into a bitstream (step 594), it is reported to an upper layer that it is necessary to attach the current packet to a buffer because the current packet has not completed a bitstream, the procedure returns to an initial step "S" to receive a next packet, and the above-described steps are repeated. When it is determined in step 592 that the current packet is the end packet of a bitstream, it is displayed that the previous packet has been completed into a bitstream, that an error has not occurred in the bitstream, and that the first packet has not been lost (step 596), the corresponding process ends, and then a following process is performed.

Through such a procedure, it is possible to perform a depacketization process for all packets with only the above-described steps when there is no packet loss, and the procedure is the same as that of the prior art.

However, if it is determined that the previous packet has completed into a bitstream when the current packet is input (step 502), it is determined if a value obtained by adding one to the sequence number of the previous packet is identical to the sequence number of the current packet (step 510). When the value obtained by adding one to the sequence number of the previous packet is identical to the sequence number of the current packet, it is reported to the upper layer through the "F" block process (step 590) that the current packet has completed a meaningful bitstream. When it is determined in step 510 that the value obtained by adding one to the sequence number of the previous packet is not identical to the sequence number of the current packet, it is displayed that an error has occurred in the first packet (step 512), and according to the characteristics of the present invention, it is reported to an upper layer through the "F" block process (step 580) that the current packet has completed a meaningful bitstream.

In the "F" block process (step 580), it is determined if the current packet is an end packet of one bitstream (step 582). Then, when the current packet is not the end packet of a bitstream, it is displayed that the previous packet has not completed a bitstream (step 584), it is reported to the upper layer that it is necessary to empty a current buffer because it is impossible to configure a current bitstream due to an error or another reason, the procedure returns to an initial step "S" to receive a next packet, and the above-described steps are repeated. When the current packet is the end packet of a bitstream, it is attempted to identify the value of a start code (step 585). When the value of the start code has been identified, it is displayed that the previous packet has completed a bitstream, that an error has not occurred in the bitstream, and that the first packet has not been lost (step 586), the corresponding process ends, and then a following process is performed. When the value of the start code has not been identified, it is displayed that the previous packet has completed into a bitstream, that an error has not occurred in the bitstream, and that the first packet has not been lost (step 588), it is reported to the upper layer that it is necessary to empty the current buffer (FLUSH_BUF), and the corresponding process ends. In this case, the procedure does not proceed to a following process.

If it is determined that the previous packet has not completed a bitstream when the current packet is input (step 502) and that the first packet has been lost (step 504), it is reported to the upper layer through the "F" block process (step 580) that the current packet has completed a meaningful bitstream.

Also, if it is determined that the previous packet has not completed a bitstream when the current packet is input (step 502), that the first packet has not been lost (step 504), and that an error has occurred in a bitstream (step 506), it is reported to the upper layer through the "F" block process (step 580) that the current packet has completed a meaningful bitstream.

In addition, if it is determined that the previous packet has not completed a bitstream when the current packet is input (step 502), that the first packet has not been lost (step 504), that an error has not occurred in a bitstream (step 506), and then that a value obtained by adding one to the sequence number of the previous packet is not identical to the sequence number of the current packet (step 508), it is displayed that an error has occurred in a bitstream (step 509), it is reported to the upper layer that only the bitstream information received up to a current time is meaningful and information after the meaningful bitstream information has been erroneously lost, and then it is reported to the upper layer through the "F" block process (step 580) that the current packet has completed a meaningful bitstream.

Through the above-mentioned procedure, the depacketization operation according to the present invention is achieved. In the procedure, it is understood in the "F" block process (step 580) according to the present invention that a branch operation is performed based on the value of a start code, differently from the conventional depacketization operation. Through such an operation, it is possible to restore one packet which is discarded in the case of packet loss according to the prior art.

Figure 6A:
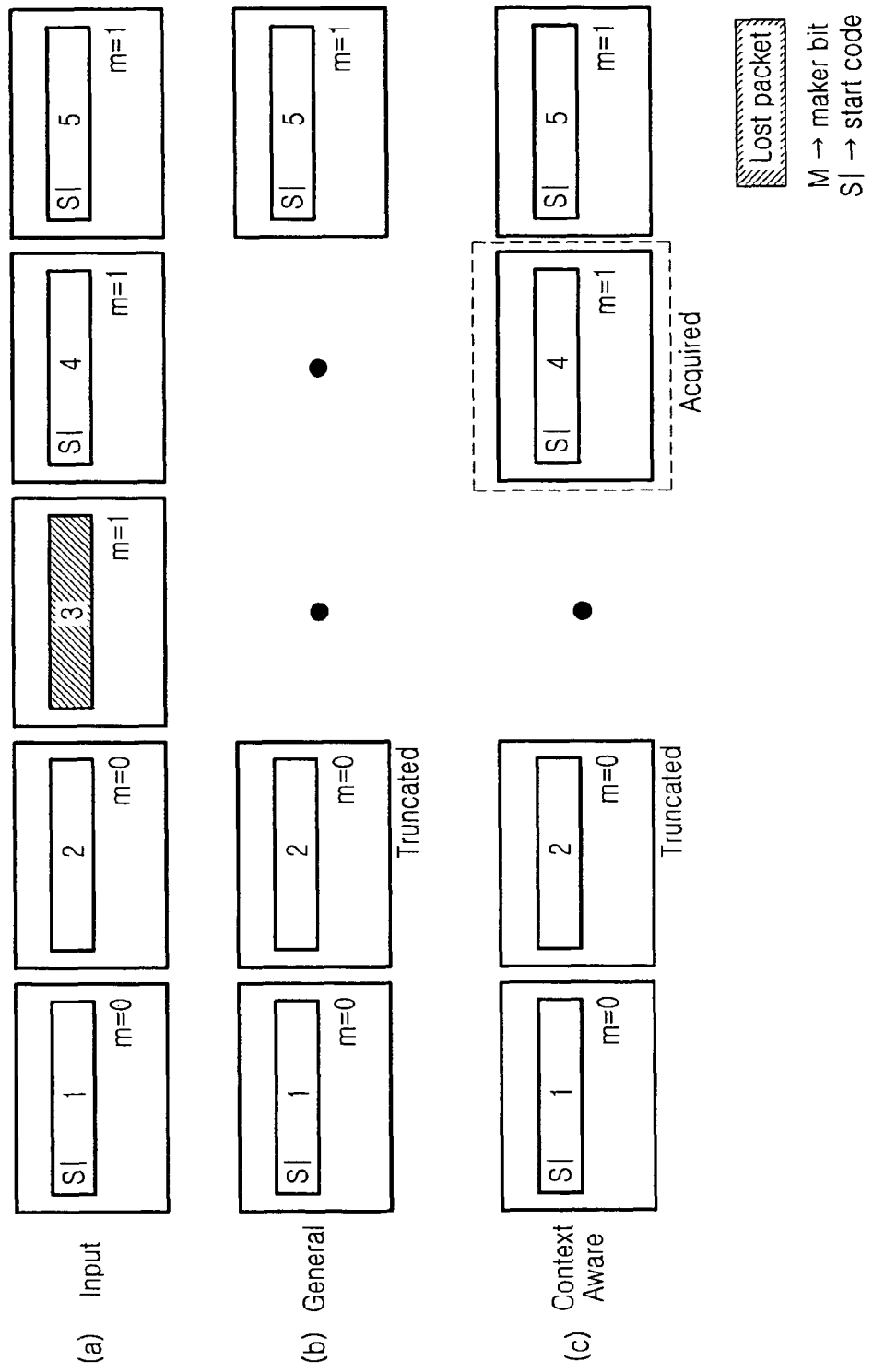
FIGS. 6A and 6B are views illustrating results of performance comparisons between a conventional depacketization method and the depacketization method of the present invention when a packet has been lost.
Figure 6B:
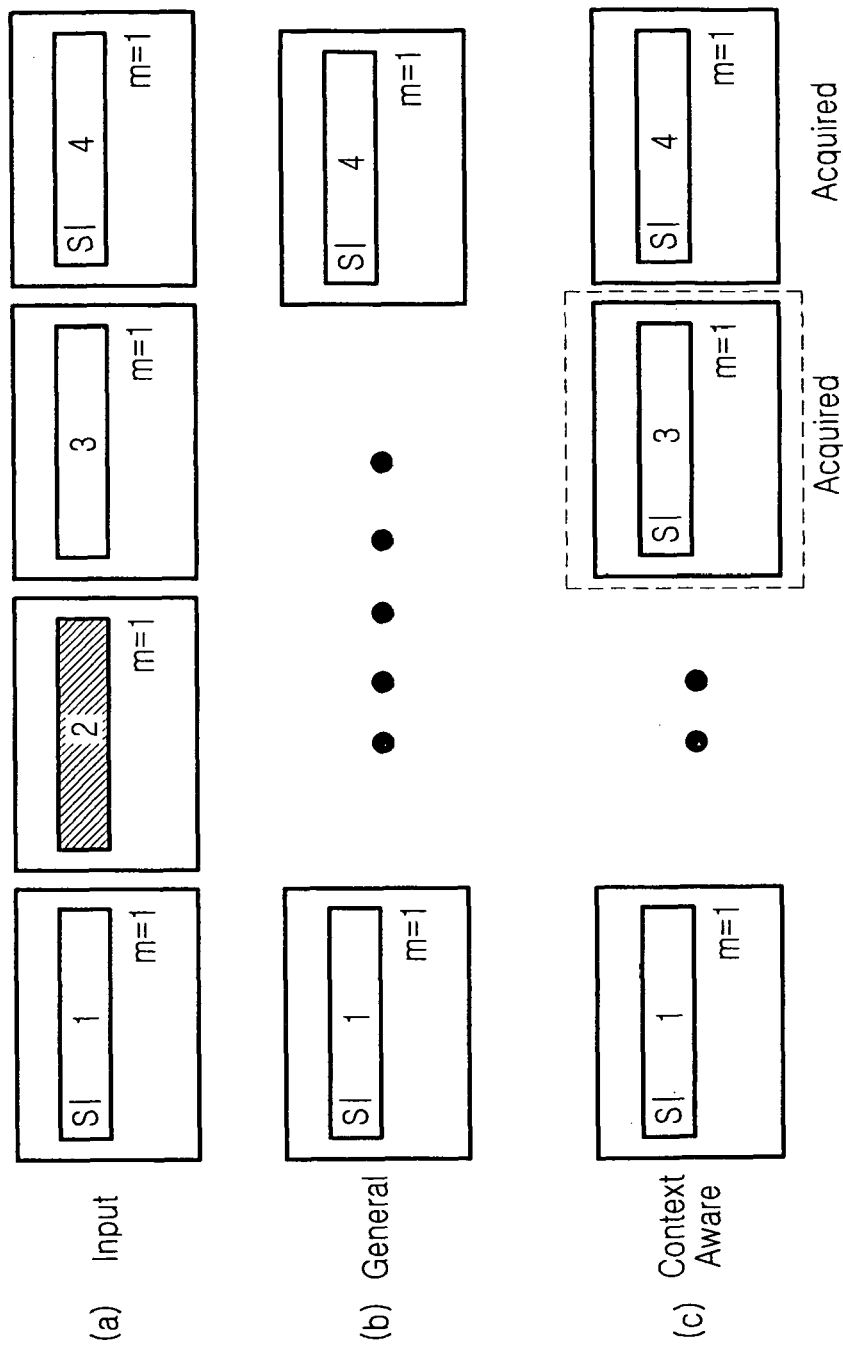

FIGS. 6A and 6B are views illustrating performance comparison results between a conventional depacketization method and the depacketization method of the present invention when a packet has been lost. In FIGS. 6A and 6B, each part "(a)" illustrates input packets, each part "(b)" illustrates a result of the conventional depacketization method, and each part "(c)" illustrates a result of the depacketization of the present invention.

First, FIG. 6A illustrates a case in which a last packet has been lost. As shown in part "(a)" of FIG. 6A, it is assumed that the first to third packets are an I frame of general image data and the first packet has been lost. According to the conventional depacketization method, as shown in part "(b)" of FIG. 6A, when a fourth packet is received, it is impossible to identify whether the received packet is a third packet or the fourth packet, so that the fourth packet is discarded. However, according to the depacketization method of the present invention, as shown in part "(c)" of FIG. 6A, when a fourth packet is received, it is possible, by use of a start code, to identify that the received packet is the fourth packet corresponding to an initial packet of a new frame, so that the fourth frame can be acquired instead of being discarded.

FIG. 6B illustrates a case in which one packet among packets independent of each other has been lost. Herein, as shown in part "(a)" of FIG. 6B, it is assumed that one P frame of a second packet in general image data has been lost. In this case, according to the conventional depacketization method, a third packet is discarded as shown in part "(b)" of FIG. 6B. However, according to the depacketization method of the present invention, as shown in part "(c)" of FIG. 6B, it is possible to restore the third packet by using a start code of the third frame.

As described above, the method for depacketization of multimedia packet data according to the present invention can be applied to multimedia data transmission/reception based on a packet network. Also, according to the method of the present invention, when a packet has been lost, an adjacent packet can be efficiently restored through an across-layer approach which uses a context-aware scheme utilizing information of a bitstream in a protocol layer. Accordingly, the depacketization method according to the present invention minimizes multimedia data loss in a wireless network, such as a WiBro, in which packet loss occurs often, thereby improving the quality of image and voice data.

While the present invention has been shown and described with reference to certain preferred embodiments of the method for depacketization of multimedia packet data, it will be understood by those skilled in the art that various changes in form and details may be made therein without departing from the spirit and scope of the invention as defined by the appended claims. Accordingly, the scope of the invention is not to be limited by the above embodiments but by the appended claims and the equivalents thereof.

What is claimed is:

1. A method for depacketization by a receiving section unit that receives a stream of a context-aware multimedia packet data having a payload startcode therein for use by at least one of a first block process and a second block process, the method comprising the steps of:
   (1) sequentially determining, by a depacketization unit of the receiving section unit, when a current packet is input:
   if a previous packet has been completed into a bit stream,
   if an error has occurred in a bit stream, and
   if a sequence number of the current packet is correctly follows a sequence number of the previous packet,
   (2) when an error of the bit stream has occurred, the receiving section determining that the current packet has been completed into a meaningful bit stream by performing the second block process,
   wherein, the second block process performs the steps of:
   (i) instructing an upper layer to empty a current buffer and return to step (1) when the current packet does not correspond to an end of one bit stream, or
   (ii) identifying a value of a start code in the payload of the multimedia packet that is extracted by a context-aware unit of the receiving section unit when the current packet corresponds to an end of one bit stream, and
   (iii) ending the second block process and performing a process subsequent to the second block process when the value of the start code has been identified to restore a packet following a lost packet, and instructing the upper layer to perform the steps of emptying a current buffer and ending the second block process without performing the process subsequent to the second block process when the value of the startcode has not been identified;
   wherein the upper layer comprises a layer that uses codec.

2. The method as claimed in claim 1, further comprising the steps of:
   (3) the receiving section determining whether the sequence number of the current packet correctly follows a sequence number of the previous packet, when it is determined in step (1) that the error on the bit stream has not occurred;
   (4) the receiving section notifying the upper layer that only bit stream information received up to a current time is meaningful and information after the meaningful bit stream information has been erroneously lost, when it is determined that the sequence number of the current packet does not follow a sequence number of the previous packet; and (5) the receiving section notifying the upper layer through the second block process that the current packet has completed a meaningful bit stream.

3. The method as claimed in claim 1, further comprising the step of:

(3) when it is determined that the sequence number of the current packet correctly follows the sequence number of the previous packet, the receiving section determines that the current packet has been completed into a meaningful bit stream by performing the first block process;

wherein the first block process comprises the steps of:

instructing the upper layer to perform the steps of attaching the current packet to a buffer and returning to step (1) when the current packet does not correspond to an end of bit stream, and ending the first block process and performing a process subsequent to the first block process when the current packet corresponds to an end of one bit stream.

4. The method as claimed in claim 3, further comprising the steps of:

(4) the receiving section determining whether the sequence number of the current packet correctly follows a sequence number of the previous packet, when it is determined in step (1) that the previous packet has been completed into one bit stream;

(5) the receiving section notifying the upper layer through the first block process that the current packet has been completed into one meaningful bit stream, when it is determined that the sequence number of the current packet correctly follows a sequence number of the previous packet; and (6) the receiving section notifying the upper layer through the second block process that the current packet has completed a meaningful bit stream, when it is determined that the sequence number of the current packet does not follow a sequence number of the previous packet.

* * * * *